April 7, 1964    E. KAMP    3,127,767
NOISE TESTING DEVICE FOR GEARS AND TRANSMISSIONS
Filed Aug. 11, 1960    2 Sheets-Sheet 1

Inventor:
Egon Kamp
By
[signature]
Patent Agent

Inventor:
Egon Kamp

United States Patent Office 3,127,767
Patented Apr. 7, 1964

3,127,767
NOISE TESTING DEVICE FOR GEARS AND
TRANSMISSIONS
Egon Kamp, Frankfurt am Main Praunsheim, Germany,
assignor to W. Ferd. Klingelnberg Sohne, Remscheid-
Berghausen, Germany
Filed Aug. 11, 1960, Ser. No. 48,932
2 Claims. (Cl. 73—162)

This invention relates to gear and transmission testing and, particularly, to such testing to determine operating noise levels.

In order to be able to use a gear pair it is in many instances indispensable that the gears will run together quietly. This is, for instance, particularly the case for the gears of a rear axle transmission of a passenger car. While it is impossible to make a gear transmission which runs completely noiselessly, it is important to be able to test such transmission in a quick, reliable, and objective manner to ascertain whether the transmission will or will not meet the requirements for substantially noiseless operation of the gears. In order that such testing operation will yield a reliable result, it must be adapted to be carried out under conditions which are as close as possible to actual conditions of operation, and the acoustic testing portion of the device must, as far as possible, be able to detect the frequencies that will be heard by the human ear.

It is a well-known fact that, heretofore, the final testing of a rear axle transmission with regard to its noise development was usually made on a test drive. During this test drive, the subjective ear of a skilled testing person decided concerning the usability of the respective transmission. While, in this instance, the testing conditions completely corresponded to the actual conditions of employment of the transmission, it is, of course, obvious that such testing could not be carried out during the manufacturing process of making the gears, aside from the fact that it was also more or less subjective so that the judgments of different testing persons concerning the same axle was hardly uniform.

With the heretofore known running testing machines, the procedure is as a rule the following one:

The pair of gears consisting of two spur or bevel gears is mounted on two spindles which are journalled in such a way that the running noise is practically zero. One of said spindles will then be driven, whereas the other spindle will usually be braked by a manually operable brake. The developed noise is judged as a rule according to the ear in comparison with a permissible level of running noise as developed by a master transmission. In some instances the noise by the gear to be tested is judged merely by the ear of an experienced testing person. This heretofore known method, however, is far too subjective in order really to obtain reliable results.

With tests in laboratories, objective noise measurements and analyses have been carried out by tone frequency spectrometers, zuchton analyzers and similar measuring devices on the market. These methods, however, have the fundamental drawback that they are far too complicated for everyday testing operations in a continuous manufacturing process inasmuch as the time for operating these testing devices is far too long, bearing in mind that the results so obtained have to be computed by evaluating diagrams so that also highly skilled personnel is required for using the said laboratory testing instruments. A testing operation effected within the course of the manufacturing process can serve its purpose only when the result can be obtained so fast that it will still admit of putting into effect conclusions concerning possible corrections of the gears which may be carried out, for instance, by a lapping operation.

It is, therefore, an object of the present invention to provide a gear noise testing apparatus which will overcome the above mentioned drawbacks.

It is another object of this invention to provide a gear noise testing apparatus which, while yielding an objective testing of the developed gear noise, will permit such testing in the course of the manufacturing process in a minimum of time without requiring highly skilled personnel.

These and other objects and advantages of the invention will appear more clearly from the following specification in connection with the accompanying drawings, in which.

The gear noise testing apparatus according to the present invention comprises a running testing machine for the gears to be tested and a noise testing device with microphone, a first amplifier following the microphone, a plurality of band filters commonly fed by the first amplifier, a second controllable amplifier following each of the filters, and indicating devices. In conformity with the present invention, each one of the band filters subdividing the frequency range has in a manner known in connection with various electro-acoustic devices, associated therewith a variable amplifier with a relay connected thereto which latter is adapted to illuminate indicating lamps and actuates an acoustic signalling device as soon as the maximum noise level for a given frequency range has been exceeded.

The running testing machine employed in connection with the noise testing installation comprises in conformity with a further development of the invention, two spindles driven by direct current motors operated in Ward-Leonard operation and variable steplessly independently of each other. This arrangement makes it possible that in both directions of rotation at random each of the two spindles may be driven while the drive motor of one spindle is employed for controlling the speed, and the drive motor for the other spindle is employed for controlling the load moment.

Figure 1:
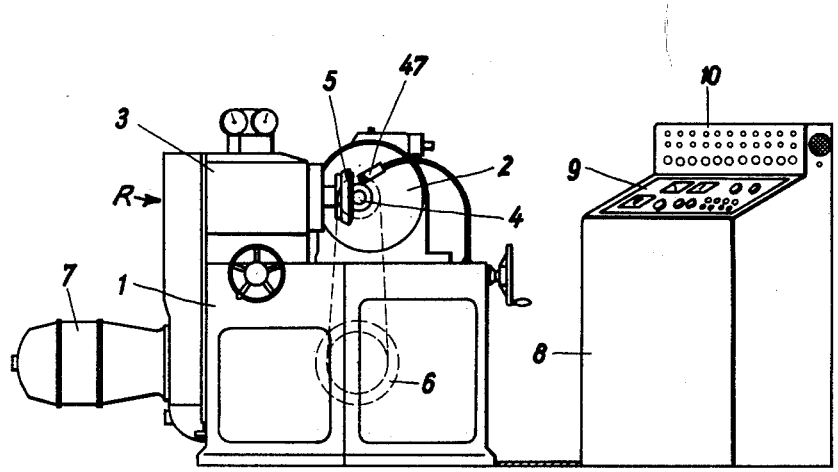
FIG. 1 illustrates a view of the entire noise testing apparatus.

More specifically, with reference to FIG. 1, the gear noise testing installation according to the invention comprises a running testing machine generally designated R, for instance for bevel gears, which is provided with a bed 1. The upper surface of bed 1 is provided with guiding paths extending perpendicularly to each other and having respectively displaceably mounted thereon a spindle stock 2 and a spindle stock 3 with spindles for the pinion 4 and axle drive bevel gear 5 to be tested. The spindles for gears 4 and 5 are driven through the intervention of belts by variable direct current motors 6 and 7 respectively, said spindles being journalled in practically noiselessly running anti-friction bearings. A switch box 8 contains the control and regulating devices for the motors 6 and 7 and also the respective operating keys on the switch board 9 as well as the noise testing device with its indicating means and operating elements on the vertical board 10.

Figure 2:
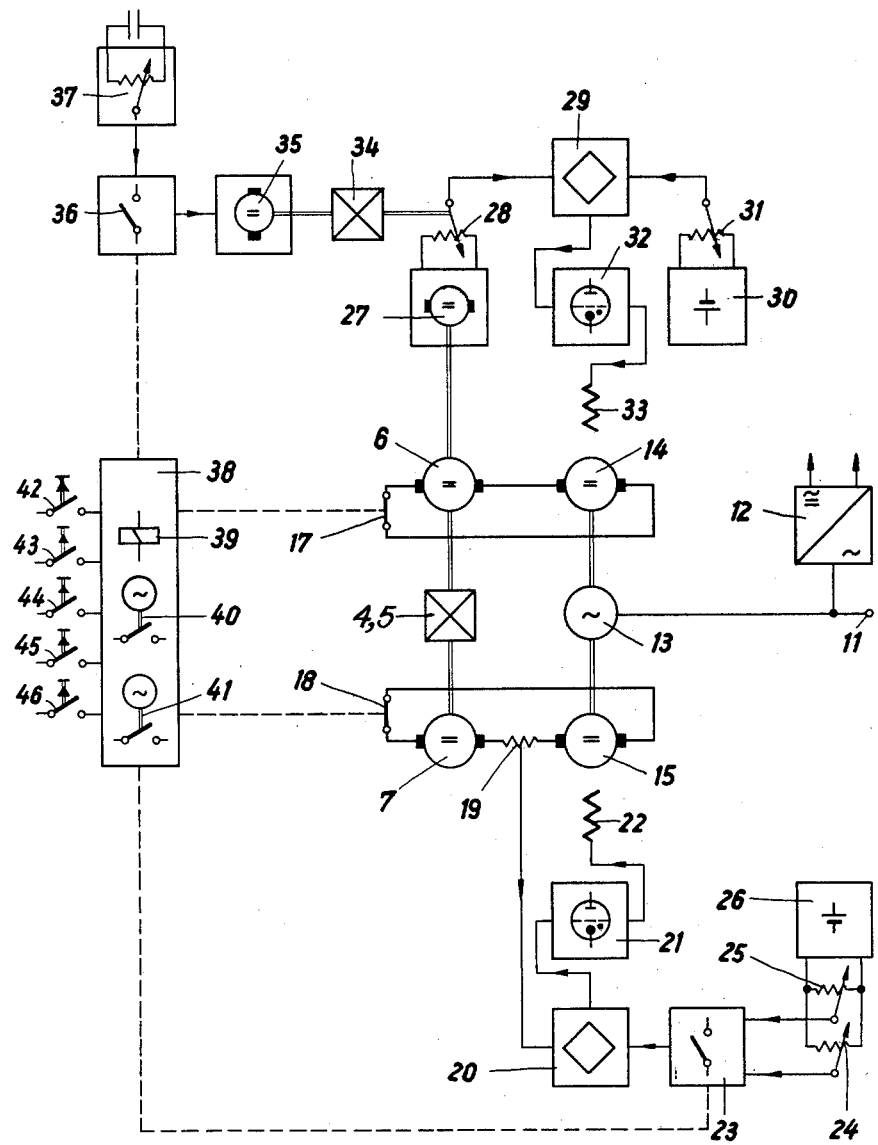
FIG. 2 is a diagrammatic circuit for the drive and control of the running testing machine.

Referring now to FIG. 2 illustrating a one-pole testing diagram of the running testing unit, the reference numeral 11 designates the three phase network terminal, whereas the reference numeral 12 designates a known current supply device for supplying the individual parts of the installation with direct and alternating current. A synchronous motor 13 drives the two direct current generators 14 and 15. Generator 14 furnishes current for the drive motor 6 of the spindle carrying the pinion 4. Generator 15 furnishes the current for the drive motor 7 rotating the spindle supporting the bevel gear 5. The gear pair to be tested is diagrammatically illustrated in FIG. 2 and designated 4, 5. Switch contacts 17, 18 are provided and are operable selectively for interrupting the drive for the gears 4, 5.

The device furthermore comprises a measuring resistance 19 at which a voltage drop may be picked off which characterizes the total current and thereby the torque of the bevel gear driving motor 7. The device furthermore comprises a Wheatstone bridge circuit 20 for purposes of adjusting the torque to be furnished by the drive motor for the bevel gear, said control being effected by the tube controlled controlling unit delivering the energizing direct current for the field coil of generator 15.

The reference numeral 23 designates a change-over relay for the nominal value of the torque. The device furthermore comprises a potentiometer 24 for adjusting the bridge comparison voltage determining the nominal torque while the pinion 4 is driving. The numeral 25 designates a corresponding potentiometer for the driving bevel gear. A torque current voltage source 26 is provided for the control potentiometers 24 and 25. A tacho-generator 27 furnishes a voltage which is proportional to the speed of the pinion drive motor 6 and which through a control potentiometer 28 in a bridge circuit 29 is counter connected to a nominal voltage picked off by the voltage source 30 through a potentiometer 31, the differential voltage through tube controlled controlling unit 32 feeding the coil 33 of the generator 14 which latter furnishes the current for drive motor 6. A slip clutch 34 connects the control potentiometer 28 with the drive motor 35 which latter, through a switch-over relay 36, is acted upon by a voltage controlled by a control potentiometer 37.

The reference numeral 38 designates a control unit for the automatic operation of the testing process. The control unit 38 comprises a multiple relay 39. 40 and 41 are timers. Push buttons 42 through 46 are provided for the following functions:

Switch 42 switches on the automatic working steps; switch 43 interrupts the automatic working operation; switch 44 effects total switch off; switch 45 controls the driving pinion; and switch 46 controls the driving bevel gear. Switch 45 when closed will close switch 17 of motor 6 while switch 46 when closed will close switch 18 of motor 7. Switches 45 and 46 are made effective by closing of switch 42 which will energize the system while operation of switch 44 will de-energize the system. Operation of switch 43 will, as stated, interrupt the automatic cycle but will not de-energize the system. Operation of switch over relay 36 may be accomplished by closing of switch 42 to initiate the automatic cycle while, during the cycle, timer 41, will operate the relay. Relay 36 controls motor 35 so that potentiometer 28 is adjusted to cause motor 6 first to come up to a predetermined maximum speed and then, after operation of relay 36 by timer 41, to cause motor 6 to slow down.

Figure 3:
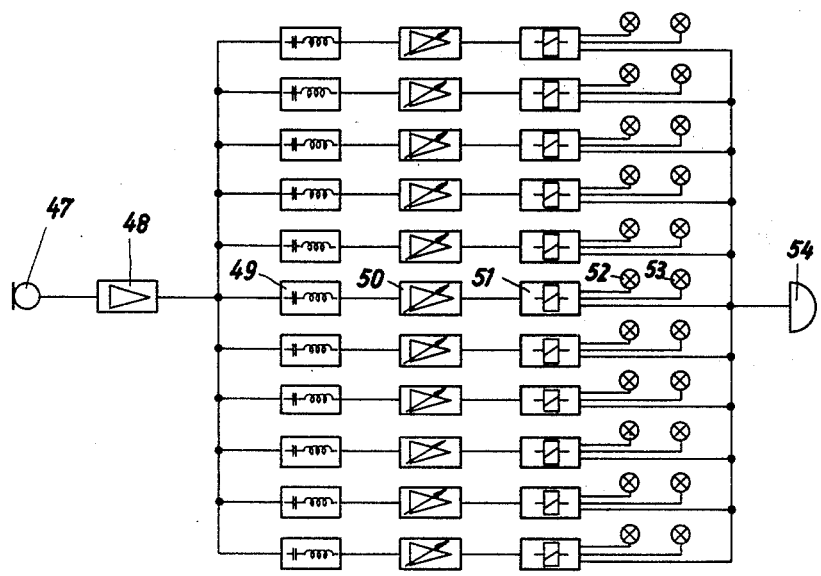
FIG. 3 is a diagram of the noise testing device.

FIG. 3 is a diagrammatic illustration of a circuit for the noise testing device in a simplified arrangement. FIG. 3 illustrates a microphone 47, a wide band amplifier 48, one of the screening and indicating units 49 (in the present case eleven being provided) of a certain frequency range each of which comprise for instance a third, within the range of the audible and disturbing frequencies from 500 to 5000 cycles per second. More specifically, 49 represents a band pass, i.e. in this instance a filter having a band with a frequency range corresponding to an interval of one third, while the reference numeral 50 designates a variable wide band amplifier and the reference numeral 51 designates a control relay. Furthermore, there are provided two different colors, for instance, green and red indicating lamps 52 and 53, respectively. Finally, the device comprises an acoustic signaling member 54, for instance, a hummer which is arranged in series with all eleven parallel band passes. Either or both of the amplifiers 48 and 50 can have their amplification factor adjusted in a known manner as, for example, by a potentiometer in the grid circuit of one or more of the tubes thereof. The operation of the arrangement is as follows:

Inasmuch as with the example of the noise testing installation for bevel gears described above, primarily the testing of rear axle drive gears is involved, the testing operation will be carried out with speeds from zero up to maximum speeds of operation and with the drive derived from the pinion corresponding to the normal driving operation of the vehicle, and also with the drive derived from the bevel gear in conformity with a drive with braking motor. The automatic course of the testing operation is such that the running testing machine, after pressing the necessary switches for the automatic working operation, namely, switches 42, 45, and 46, will speed up the motor 6 of the pinion spindle 4 to a previously determined maximum speed adjusted at the potentiometer 31 while the pinion is driving. At this maximum speed for the driving pinion, the running testing machine will continue to run over a predetermined period which is adjusted by the timer 40 whereupon the machine will shift over to the driving bevel gear. This is effected by means of an impulse from timer 40 which will operate the shift-over relay 23 and which will also start the timer mechanism 41. The machine now runs for a certain predetermined time, said predetermined time being determined by the timing mechanism 41. The machine then following the operation of the shift-over relay 36 which is now excited by the timing mechanism 41, will again reduce the speed of the pinion drive motor 6 to zero. The increase and subsequent decrease in speed from the maximum speed will be effected by adjustment of the potentiometer 28 which adjustment is effected by means of the slip clutch 34 and drive motor 35. In conformity with the differential voltage at the Wheatstone bridge between the potentiometer terminals 28 and 31, the field excitation 33 of generator 14 is controlled by a control unit 32 in such a way that the motor 6 fed by the generator current will, through tachogenerator 27, produce a counter voltage which equals the voltage controlled by the potentiometer 31 whereby the adjusted maximum speed will be obtained. The velocity for the up and down control of the speed will be selected by adjusting the potentiometer 37 furnishing the voltage for the motor 35. The timing mechanism 40 determines the time for which the testing machine runs with driving pinion. Said timing mechanism will be made effective as soon as the control potentiometer 28 starts. If the latter reaches its respective abutment, the slip clutch 34 becomes effective.

The control of the desired torque at the spindle of the bevel gear 5 is effected by means of the Wheatstone bridge 20. The voltage drop occurring at the terminals of the resistor 19, passed through by the current of the circuit between generator 15 and motor 7 for the bevel gear is compared in said bridge 20 with one of the control voltages adjusted at the intermediate terminals of the potentiometers 24 and 25. The voltage difference in the bridge then will control field 22 through the tube controlled control unit 21 in such a way that the voltage at the intermediate terminal of the resistor 19 will equal the adjusted control voltage. Inasmuch as the torque of the motor 7 is proportional to the current in the resistor 19, the desired torque will be adjusted. By means of the change-over relay actuated by the timer mechanisms 40 and 41, the intermediate terminal of the potentiometer 24 or that of the potentiometer 25 is connected to bridge 20 so that during the change from one to the other connection also the polarity will be reversed. As a result thereof, also the polarity of the voltage to be adjusted at the intermediate terminal of resistor 19, i.e. also the direction of flow of the current in circuit 15 to 7 will be reversed. The direct current motor 7 will therefore act as a brake in one instance (generator-like), and will act as a driving motor in another instance (motor-like). In the first instance, therefore, the pinion will drive the bevel gear, whereas in the second instance the pinion will be driven by the bevel gear.

The above mentioned operations will be effected and controlled automatically in conformity with the operation of the respective time mechanisms.

The testing device according to the invention operates in the following manner. The running noise (air sound or body sound) of the gear pair to be tested and received by the microphone 47 passes as electric impulse through the wide band amplifier 48 to the parallelly arranged, for instance, eleven band passes or band pass filters 49 which each allow the frequency range of a third to pass through. The partial oscillations of the frequency mixture, which partial oscillations have been passed through by the filters 49 then pass through wide band amplifiers 50 once more amplified to control relay means 51 of the lamps 52 and 53. The amplifying factors of the individual wide band amplifiers 50 are so adjusted that through the intervention of relay 51, the red lamp 52 will be switched on as soon as the admissible sound level has been exceeded in said filters 49. The adjustment of the reinforcing factors of the individual wide band amplifiers is, in conformity with one or more transmissions, considered proper as to their running noise effected in such a way that the red lamps will be illuminated only when the limits of the sound level as determined by said transmission will in the individual ranges be exceeded in a non-permissible manner. The green lamp 53 will then be illuminated continuously as long as the noise level in the respective range has not been exceeded. The lamp 53 will be turned off only for the duration of the respective period during which said sound level is exceeded. The turning on and off of each two indicating lamps 52 and 53 by relay 51 is effected in the following manner. Those relays which, in normal condition, i.e. when the voltage adjusted in the amplifier 50 does not exceed the voltage corresponding to the permissible sound level, are energized, drop out when said limit or level has been exceeded. When said relays drop out, they actuate a switch which closes the circuit for the red lamp 52 and also bring about opening of a second switch which turns off the previously energized green lamp 53. The acoustic signal will be given or a further lamp will be illuminated which may be arranged at other points for instance, at the running testing machine, as soon as in any one of the ranges the sound level is exceeded. This acoustic signal or additional lamp will switch off only after the testing operation has been completed.

The above described noise testing installation for gears and transmissions will allow a running test of the wheels without any time lost and at any time during the testing operation will furnish a precise picture concerning the noise behavior of the transmission so that the testing operator may immediately recognize any excess of the admissible noise in a partial range so that the situation can reliably and objectively be judged when speeding up, at maximum speed, in pulling operation (pinion driving) and in pushing operation (wheel driving), and thus meets all requirements which have to be met by a modern test stand for determining the noise of gears.

It is, of course, to be understood that the present invention is, by no means, limited to the particular construction and arrangement shown in the drawing, but also comprises any modifications within the scope of the appended claims. Thus, the present invention is not limited to a test installation for bevel gears. By correspondingly arranging the spindle of the running testing unit, all occurring forms of gear transmissions and also anti-friction bearings and other elements may be tested by the arrangement according to the invention.

What I claim is:

1. In a noise testing installation for gears and transmissions in which the gears are run together and the noise developed thereby detected by a microphone, and having an amplifier which is fed by the microphone: first and second spindles for supporting said gears, a plurality of band filters in parallel fed by the said amplifier operable to subdivide the frequency of the amplifier output, a plurality of variable second amplifiers respectively connected to be supplied by said band filters, a plurality of relays respectively connected to said second amplifiers to be responsive to the outputs thereof, optical and acoustical signaling means electrically connected to said relays operable in response to actuation of the relays which occurs when the permissible noise level of the gears being tested is exceeded in any of the frequency ranges of the said band filters, switching and control means for automatically controlling the speed of one of said spindles for a predetermined cycle, said switching and control means comprising: a timer, a motor, a slip clutch driven by the motor, a first potentiometer under the control of the timer for supplying the motor, a second potentiometer connected for being adjusted by the said slip clutch, a tachometer driven by said one of the spindles operable to develop a voltage and connected to supply said second potentiometer, a bridge circuit, a direct current source, a third potentiometer connected across the direct current source, the voltage from said third potentiometer and for the said second potentiometer adjusted by the slip clutch being impressed on opposite sides of said bridge circuit, a generator, a drive motor connected to be supplied by said generator and driving the said spindle to which the tachometer is coupled, and an electric control unit connected to be sensitive to the voltage difference in the bridge circuit and operable for furnishing current for the field excitation of the said generator, and a drive motor for the other of said spindles.

2. In a noise testing installation for gears and transmissions in which the gears are run together and the noise developed thereby detected by a microphone, and having an amplifier which is fed by the microphone: first and second spindles for supporting said gears, a plurality of band filters in parallel fed by the said amplifier operable to subdivide the frequency of the amplifier output, a plurality of variable second amplifiers respectively connected to be supplied by said band filters, a plurality of relays respectively connected to said second amplifiers to be responsive to the outputs thereof, optical and acoustical signaling means electrically connected to said relays operable in response to actuation of the relays which occurs when the permissible noise level of the gears being tested is exceeded in any of the frequency ranges of said band filters, and means for controlling the torque between the gears being tested including switch and control means and comprising: a direct current motor driving one spindle, a generator serially connected in circuit with the motor, a resistor serially connected with the motor and generator and having an intermediate terminal, a measuring bridge to which the said intermediate terminal of the resistor is connected, timer means, a switch operatively connected to said timer means so as to be actuated by the timer means, a direct current source, a pair of adjustable potentiometers supplied by said source each having an intermediate terminal, an electrical unit connected to said bridge and also connected for supplying current for the field excitation of said generator, the magnitude of the current so supplied and, therefore, the torque between the gears being tested being determined by adjustment of said potentiometers, said potentiometers and said resistance being adapted for having the voltages of their respective intermediate terminals compared by said bridge, said switch when actuated by said timer means being operable for selectively individually connecting said intermediate terminals of the potentiometers to said bridge, the voltage difference in said bridge controlling said electrical unit, and a drive motor for the other of said spindles.

References Cited in the file of this patent

UNITED STATES PATENTS

| | | |
|---|---|---|
| 1,644,876 | Domizi | Oct. 11, 1927 |
| 1,981,693 | Firestone et al. | Nov. 20, 1934 |
| 2,331,236 | Schaefer | Oct. 5, 1943 |
| 2,468,648 | Abbott et al. | Apr. 26, 1949 |
| 2,799,015 | Bell | July 9, 1957 |
| 3,029,385 | Steinbrenner et al. | Apr. 10, 1962 |

FOREIGN PATENTS

| | | |
|---|---|---|
| 1,129,181 | France | Sept. 3, 1956 |